July 19, 1960

J. M. SLATER 2,945,643

CONTROL SYSTEM

Filed Nov. 28, 1955

INVENTOR.
JOHN M. SLATER

BY

ATTORNEY

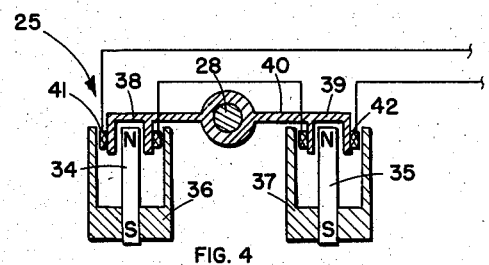
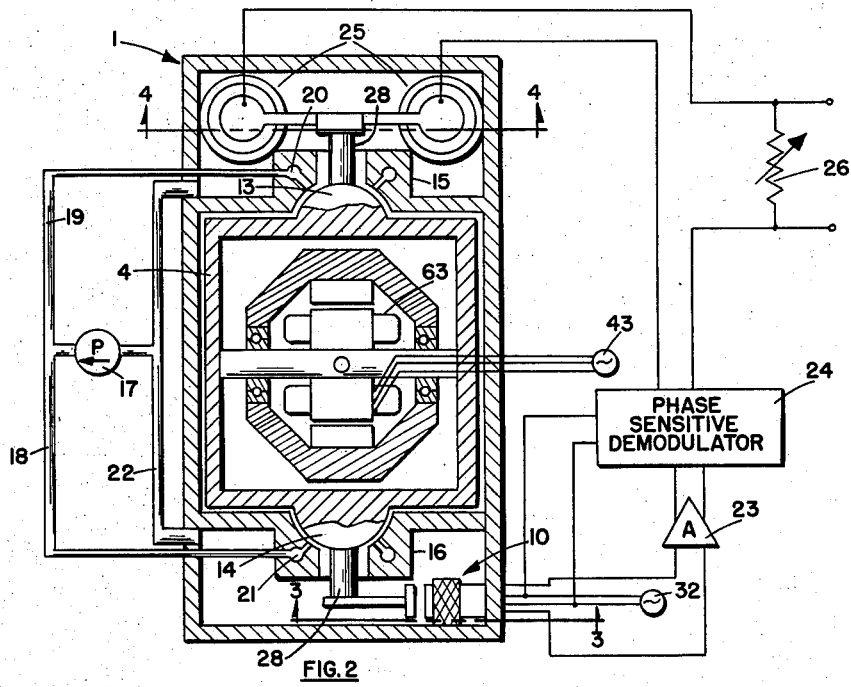
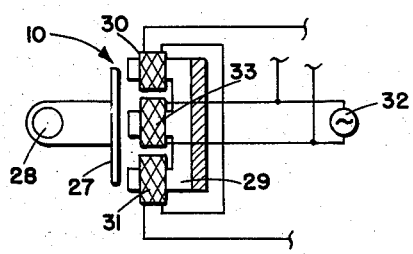

July 19, 1960 J. M. SLATER 2,945,643
CONTROL SYSTEM
Filed Nov. 28, 1955 5 Sheets-Sheet 3

INVENTOR.
JOHN M. SLATER
BY
*William R. Lane*
ATTORNEY

July 19, 1960  J. M. SLATER  2,945,643
CONTROL SYSTEM

Filed Nov. 28, 1955  5 Sheets-Sheet 4

INVENTOR.
JOHN M. SLATER
BY
*William R. Lane*
ATTORNEY

July 19, 1960

J. M. SLATER 2,945,643

CONTROL SYSTEM

Filed Nov. 28, 1955

*INVENTOR.*
JOHN M. SLATER

BY *William R. Lane*

ATTORNEY

United States Patent Office 2,945,643
Patented July 19, 1960

2,945,643

CONTROL SYSTEM

John M. Slater, Fullerton, Calif., assignor to North American Aviation, Inc.

Filed Nov. 28, 1955, Ser. No. 549,252

19 Claims. (Cl. 244—14)

This invention relates to an automatic control system for a missile, and in particular relates to self-contained apparatus which maintains a programmed attitude about the three principal axes of the missile during time of travel.

In a ballistic type missile, or a torpedo, it is desirable to have a minimum of control equipment. This invention contemplates a control system which accomplishes control of aerial missiles having ranges on the order of 100 to 200 miles, or torpedoes having running time, say, on the order of a minute or so.

A typical gyroscopic flight control system utilizes displacement-type gyroscopes having two degrees of freedom. A signal is produced by the gyroscope whenever the missile departs from a predetermined attitude and correcting signals control the aerodynamic surfaces, jet vanes, etc., of the missile through a servo system. However, displacement-type gyros, such as are used in gyro verticals and directional gyros, are difficult to fabricate and adjust, and must be delicately handled. These gyroscopes must have considerable angular freedom and therefore present exacting problems in design, fabrication, assembly, and adjustment. Difficulties are acute in the case of equipment used in rocket-type missiles because of the severe vibrations occurring therein. Displacement-type gyroscopes which function satisfactorily in an aircraft sometimes are inoperable in missiles due to the effect of vibrations. Further, the signal provided by displacement-type gyroscopes is a measure of angular displacement of the missile frame which signals, in turn, must be electrically differentiated to obtain rate signals necessary for proper flight control servo functioning. The use of rate gyroscopes as suggested by this invention eliminates several of the above problems. Rate gyroscopes have only a single degree of freedom, and involve only a small angular displacement and consequently, can be constructed more ruggedly. Their construction is relatively simple, and the provision of flotation bearings to make them more precise is easier. The rate gyroscope provides a signal proportional to the angular velocity of the missile frame, which is required in proper servo control of attitude. By the use of a computer to perform Euler's angle resolution, and an integrating device to produce angle signals from angular velocity signals, a missile may be made to maintain or follow a predetermined, programmed attitude. Vehicle velocity may be programmed, too, as a function of the programmed attitude or as a function of time.

It is therefore an object of this invention to provide a guidance control system for a missile.

It is another object of this invention to supply guidance signals according to programmed attitude.

Another object of this invention is to provide a guidance system supplying control signals derived from angular velocities of a missile.

It is another object of this invention to provide an attitude control system utilizing rate gyroscopes.

Another object of this invention is to provide guidance and velocity control for a missile.

It is a still further object of this invention to provide a navigation system in which rate gyroscopes are attached directly to the frame of the missile.

A still further object of this invention is to provide a control system for a missile causing it to maintain programmed attitudes during a course of travel.

Other objects of invention will become apparent from the following description taken in connection with the accompanying drawings, in which Fig. 1 is a schematic representation of the control system;

Fig. 2 is a schematic cross-section of a rate gyroscope adapted for use in the system of the invention;

Fig. 3 is a schematic of a pickoff for the gyroscope of Fig. 2;

Fig. 4 is a schematic cross-section of the torquer of the gyroscope of Fig. 2;

Figure 1:
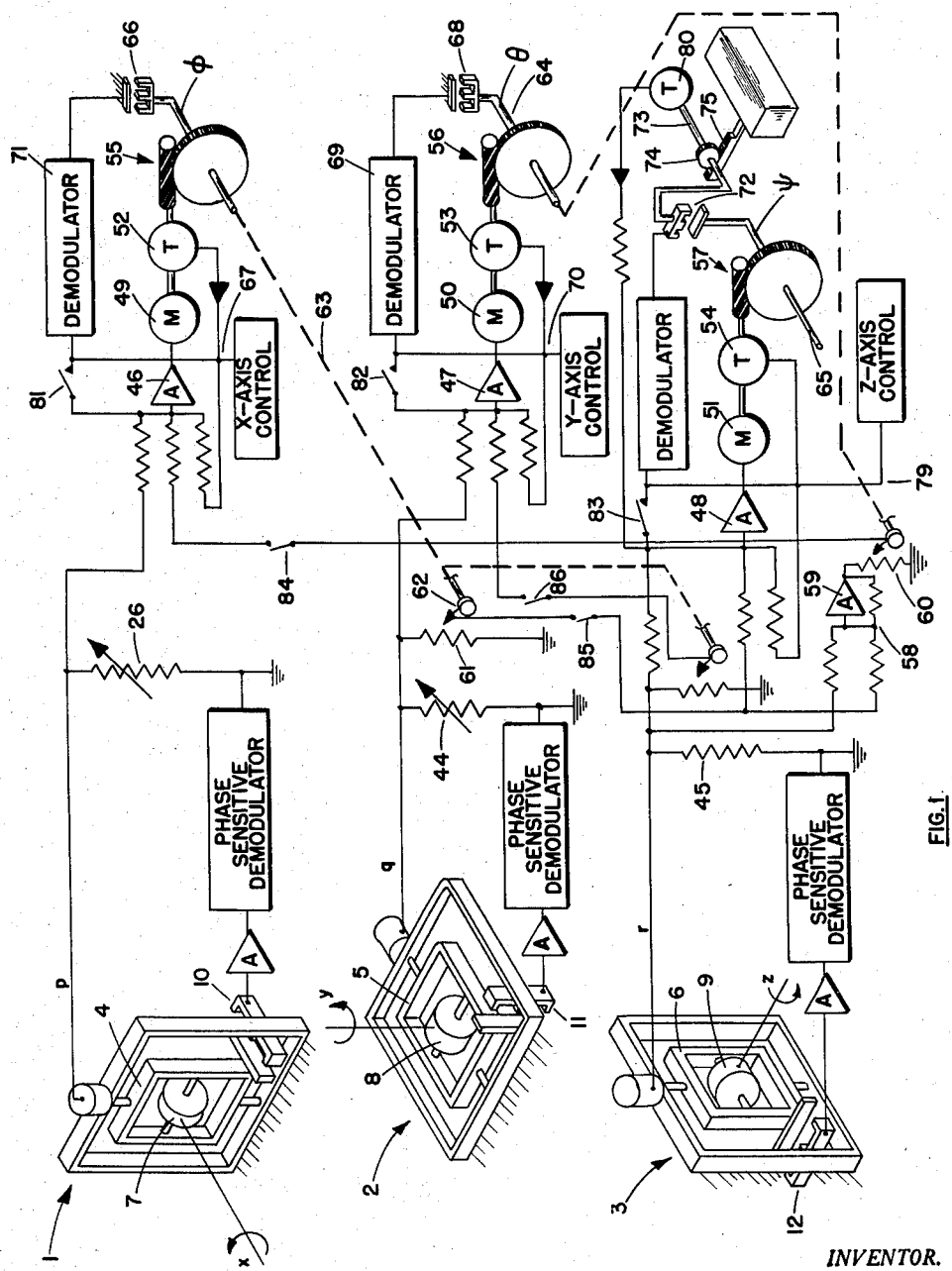

Referring now to Fig. 1, rate gyros 1, 2 and 3 are attached to the frame of the missile. These rate gyros are single-axis gyros, each having an internal gimbal 4, 5 and 6 which mount, respectively, rotors 7, 8 and 9. Rate gyro 1 has its input (sensitive) axis along the $x$-axis rate gyro 2 has its input axis along the $y$-axis, and the rate gyro 3 has its input axis along the $z$-axis. Angular velocity of the frame about any of these axes causes precession of the internal gimbals 4, 5 or 6 which will be detected by the respective pickoffs 10, 11 or 12 (considerably enlarged for clarity), which signals are utilized to supply a restoring torque to the gyroscope and also to provide information for proper flight and guidance of the aircraft. The novel concept herein is the utilization of rate gyroscopes to indicate angular velocities for control; and resolution and integration of the signals to indicate attitude. To obtain these features in a missile control system, the rate gyroscopes must operate over an angular velocity range of the order of 0.0001 radians per second to 1 radian per second and have a drift rate of the order of 15 degrees per hour (earth rate). The shorter the time of flight, of course, the less stringent are the requirements as to drift rate.

Referring momentarily to Fig. 2, a schematic is shown of a rate gyroscope 1 having a case, or frame, within which is mounted gimbal 4 by means of a low-friction flotation-type bearing comprised of hemispheres 13 and 14 situated within concave bearing blocks 15 and 16. The gyro motor is illustrated as a wound stator 63 excited by three-phase source 43. Pump 17 provides fluid, such as air or a suitable liquid, through channels 18 and 19 to manifolds 20 and 21 which provide the flotation fluid between the hemispheres and their respective bearing blocks to suspend the hemisphere within the block without physical contact. Thus, a minimum of friction is incurred between gimbal 4 and case 1. Channel 22 provides a return path for flotation fluid to pump 17. A similar type fluid bearing support for a gyroscopic gimbal is disclosed in the patent to V. A. Tauscher, et al. No. 2,617,695 for Zonal Ball Air Bearing issued November 11, 1952.

Pickoff 10 provides a signal indication of any rotation (precession) of inner gimbal 4 relative to case 1. The signal is transmitted to amplifier 23 and then to phase-sensitive demodulator 24, which provides a D.-C. signal which indicates the rotation of inner gimbal 4 and reverses its polarity when the direction of rotation is reversed. The signal is then sent from demodulator 24 to gyro torquer 25 through resistor 26. Torquer 25, then, acts in response to pickoff 10 to remove all rotation of inner gimbal 4 with respect to outer case 1.

Referring to Fig. 3, the pickoff 10 is more clearly illustrated in which a soft iron member 27 is connected to be rotated by shaft 28 attached to inner gimbal 4. Laminated core 29 is of E-type configuration, having coils 30 and 31 on its outer limbs connected in series opposition to each other and providing an output to amplifier 23, as shown in Fig. 3. Oscillator source 32 is connected to coil 33 on the center limb of core 29 and acts to provide excitation as soft iron member 27 moves relative to the laminated core 29. Flux is unevenly coupled from center limb 33 to outer limbs 31 and 30 providing a signal whose phase indicates the direction of rotation of shaft 28. Oscillator 32 also provides a reference frequency to phase sensitive demodulator 24 to demodulate the output signal.

Fig. 4 illustrates torquer 25 consisting of magnets 34 and 35, each disposed within a respective soft iron flux-return member 36 and 37. Nonmagnetic cups 38 and 39 are disposed at opposite ends of arm 40 which is rigidly connected to shaft 28. Around the circumference of each nonmetallic cup is a respective coil 41 and 42. These coils are connected to receive the signals from pickoff 10 and exert a torque about shaft 28 depending upon the electrical signal received.

Figure 5:
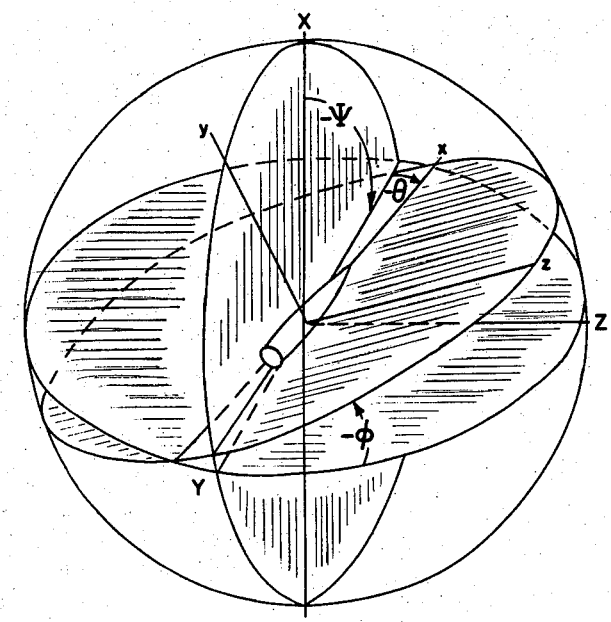
Fig. 5 is an illustration of the coordinate systems associated with the missile.

Referring now to Fig. 5, axes $x$, $y$, and $z$ are, respectively, the longitudinal axis of the missile and the transverse axes which are normally vertical and horizontal in level flight. The earth-fixed coordinate system is a predetermined coordinate system based on a vertical plane XY, which is often termed "the guidance plane," which includes the launch point and the target. Axis X is assumed to be parallel to the vertical at the launch point. Axis Z is horizontal. Plane YZ is drawn through the $x$ axis of the aircraft. This XYZ coordinate system, being earth fixed, has a known relation to inertial or fixed space. Angle $\psi$ is the angle between the X axis and the projection of $x$ on the XY plane.

Angle $\theta$ is the angle between the $x$ axis and its projection on the XY plane.

Angle $\phi$ is the angle between the $xz$ plane and the XZ plane.

Angles $\psi$, $\theta$, $\phi$ as so defined (in conjunction with Fig. 5) constitute a set of Euler's angles.

At the launching point, if the ballistic missile is assumed to be in a vertical position, the system $xyz$ coincides with XYZ.

During the rise and flight of the missile in the guidance plane, $\psi$ gradually increases.

In this embodiment, it is assumed that, roll, and yaw ($\phi$ and $\theta$) are kept, on the average, within a few degrees of zero, such as less than five or ten degrees, and that pitch ($\psi$) is kept within a few degrees of the programmed, or desired angle.

Angular velocities of the missile frame in its coordinate system $x$, $y$, $z$ are denoted $p$, $q$, $r$. Thus, $p$ is the angular velocity about the $x$ axis of the missile, i.e., rate of roll; rate of yaw is $q$; and rate of pitch is $r$.

Angular velocities of the missile in the earth-reference system are denoted $\dot{\psi}$, $\dot{\theta}$, $\dot{\phi}$. Thus, $\dot{\psi}$ is the rate of inclination of the missile relative to the launch-point vertical and $\dot{\theta}$ and $\dot{\phi}$ are attitude (yaw and roll) rate changes in the particular coordinate system defined in Fig. 5.

A mere integration of missile frame rates $p$, $q$ and $r$ will not give $\phi$, $\theta$; and $\psi$, since the two sets of quantities are in different coordinate systems. The following expressions give the relations between the angular velocity components $p$, $q$, and $r$ and rates of change of the Euler angles $\psi$, $\theta$, and $\phi$:

(1) $$\dot{\psi}=\frac{q \sin \phi + r \cos \phi}{\cos \theta}$$

(2) $$\dot{\theta}=q \cos \theta + r \sin \phi$$

(3) $$\dot{\phi}=p+(r \cos \phi + q \sin \phi) \tan \theta$$

The concept of this invention is to obtain from rate gyros signals which are proportional to $p$, $q$, and $r$ (the angular velocities of the missile about its own axes $x$, $y$, $z$), multiply them by the various functions of $\phi$ and $\theta$ (as shown in Equations 1, 2 and 3) to transform them into the originally chosen guidance coordinate system and obtain the attitude rates in that coordinate system of $\dot{\psi}$, $\dot{\theta}$, and $\dot{\phi}$, that is to say, rates of change of the Euler angles $\psi$, $\theta$ and $\phi$ which are defined with reference to a system of coordinates (X, Y, Z in Fig. 5) having a known relation to inertial space. The terms $\dot{\psi}$, $\dot{\theta}$, $\dot{\phi}$ are integrated to yield the corresponding Euler angle terms. The procedure of converting signals corresponding to angle velocity components $p$, $q$, $r$ to Euler angle rates may be defined, as utilized herein, as the procedure which provides an Euler angle transformation of such signals.

It is apparent that the device of the invention may be used for guidance choosing other planes, such as the control of a torpedo (aerial or marine) in pitch and roll while programming the course (yaw).

It is possible to make a computer which solves exactly the Equations 1, 2 and 3 above, but in the present state of the computer art, the complexity and the requirements would largely offset the stated advantages of use of rate gyros, namely, reduction of equipment. With the advent of newer, more compact digital or analog computers, it is to be expected that these computations could be performed exactly without exorbitant requirements for space or equipment.

However, in the present application, computer simplification can be obtained by considering maneuverability to be restricted to relatively small angular departures as regards the quantities $\theta$ and $\phi$; and Equations 1, 2 and 3 can be rewritten, replacing the sine and tangent of an angle by the angle itself and the cosine by unity:

(4) $$\dot{\psi}=q\theta+r$$

(5) $$\dot{\theta}=q+r\phi$$

(6) $$\dot{\phi}=p+(r+q\phi)\theta$$

The mechanization of these equations allows attitude to be computed with adequate accuracy despite deviations in $\theta$ and $\phi$ of the order of a few degrees. The procedure (carried out in a computer) of converting signals corresponding to rates $p$, $q$, $r$ into Euler angle rates $\dot{\psi}$, $\dot{\theta}$, $\dot{\phi}$ is defined herein as that of providing an Euler angle transformation of such signals, whether performed in terms of the exact Equations 1, 2, 3 or the approximate Equations 4, 5, 6.

Referring now to Fig. 1, rate gyros 1, 2 and 3 are disposed along frame axes $x$, $y$, and $z$ to measure the angular velocities $p$, $q$, and $r$ about those axes. The outputs are imposed across resistors 26, 44, and 45, respectively, and are received at summing amplifiers 46, 47, and 48, the output of which supplies motors 49, 50 and 51, which in turn drive tachometers 52, 53 and 54 and gear trains 55, 56 and 57. Each tachometer is of precision D.-C. type which consists essentially of a D.-C. generator which by proper design is caused to give a voltage output linearly proportional to shaft speed over a wide range. The output of each tachometer is fed back to its respective amplifier in a sense to oppose the incoming signal. Thus, each motor shaft is caused to rotate at a rate proportional to the signal applied to the amplifier. The signal received is thereby integrated, the number of revolutions being the integral.

Taking, for example, $\phi$ and $p$, these quantities are not equal except in a special case where the $x$ axis lies in the guidance plane and the correction term must be introduced as indicated in Equation 6. This term is computed as follows: A signal proportional to $q$ is received from rate gyro 2 to excite potentiometer 61 whose wiper 62 is rotated by shaft 63 according to $\phi$. The output at wiper 62 is, then, $q\phi$ which is received at junction 58. A signal proportional to $r$ from rate gyro 3 is added to $q\phi$ at junction 58 and sent to the input of amplifier 59, which excites a linear potentiometer 60. The wiper of the shaft on potentiometer 60 is driven by gear train 56 of the $\theta$ channel, which acts to multiply the quantities $r+q\phi$ by $\theta$. The output at the wiper of potentiometer 60 is thus $(r+q\phi)\ \theta$, as indicated in Equation 6, which is fed to the input of amplifier 46 for addition to the $p$ signal. Motor 49, then, drives gear 55 and shaft 63 according to $p+(r+q\phi)\ \theta$ which, according to Equation 6, is $\dot\phi$. The number of revolutions of shaft 63 is the integral of $\dot\phi$ which is angle of departure. Shaft 63 has a pickoff 66 (similar, for example, to pickoff 10, Fig. 3) which detects any motion of the shaft 63 with respect to the airframe. The pickoff signal is received by demodulator 71 and supplied in negative feedback to point 67 and is sent to the X axis controls of the missile so as to reduce the error. In this way, angle $\phi$ is kept at a minimum or at zero to cause the assumptions made for Equations 4, 5 and 6 to occur.

At point 67, the tachometer output is also included to provide signals of angular velocity in the predetermined coordinate system, which signals provide a considerable portion of the control signal in order that short-period oscillations, about the X axis, due to gusts are damped thereby. The devices controlled by the signals at point 67 may be valves, or actuators, controlling vanes, aerodynamic surfaces or servos on movable rocket motors.

The $y$-axis control system is similar to the $x$-axis system explained above, in which pickoff 68 detects any motion of shaft 64 relative to the frame to hold the angle $\theta$ (departure in yaw) at zero or at a minimum to conform to the assumptions made to arrive at Equations 4, 5 and 6. The signal is demodulated in demodulator 69 and sent to point 70 for $y$-axis control. Point 70 also receives a considerable portion of its control signal from tachometer 53 which indicates angular velocity in yaw in the predetermined coordinate system, to minimize oscillations in yaw.

The $z$-axis control is an example of the insertion of programming into the system. In this illustration, assuming the missile is to be caused to rise vertically and then turn over to some predetermined inclination, it is seen from Fig. 5 that the angle $\psi$ is to change, and therefore, the missile control must be programmed about the $z$-axis.

Figure 6:
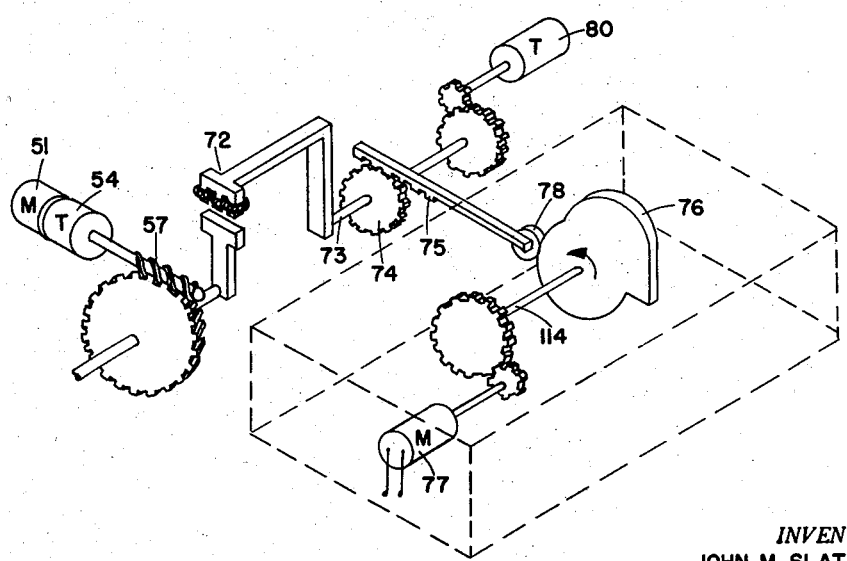
Fig. 6 is an illustration of apparatus programming the attitudes of the missile.

Pickoff 72 is not fixed to the missile as are pickoffs 66 and 68, but, rather, is mounted on a shaft 73, Fig. 6, having a pinion gear 74 driven by rack 75. Cam 76 is cut to provide the programmed pitch angle of the missile. In another embodiment, the cam may be cut to provide the programmed azimuth of a torpedo. Motor 77 drives the cam 76, and follower 78 actuates rack 75 to move pickoff 72. Motor 77 is a D.-C. motor driven at constant speed in accordance with a standard source. Point 79, Fig. 1, receives the signal indicating any difference in programmed pitch angle and actual pitch angle. Point 79 also receives rate of pitch signal ($\dot\psi$) in negative feedback from tachometer 54 to provide damping for short-period oscillations.

Since the programming of pitch, $\psi$, imposes a steady rate as seen by gyro 3, such rate must be compensated for or there will appear a spurious signal at the $z$-axis control device. Accordingly, tachometer 80 is provided on shaft 73, which generates a signal proportional to the rate of change of programmed $\psi$. This signal is added at amplifier 48. As a result, rate gyro 3 will act to damp out short-period oscillations but will not interfere with the pitch programming.

In summary, shafts 63, 64 and 65 are driven at the rates $\dot\phi$, $\dot\theta$, and $\dot\psi$, respectively, and the shaft positions represent $\phi$, $\theta$, and $\psi$.

Switches 81, 82 and 83 are normally open but in pre-launching operations are closed to prevent drift of shafts 63, 64 and 65 due to system imperfections. Switches 84, 85 and 86, when open, illustrate a more simplified concept of the device in which it is assumed the guidance system maintains a tight control over the missile and no appreciable errors in yaw and roll occur. In that instance, shafts 63, 64 and 65 represent integrated angles of roll, yaw, and pitch, respectively, with no Euler angle transformation to any coordinate system. (The reason being that the assumption is made that the guidance system closely controls the path of the missile and, therefore, the missile frame coordinates lie substantially along the chosen coordinate system.) With the switches closed, however, Euler angle transformation is computed and the system can tolerate a few degrees departure from the predetermined path and attitudes.

It is to be understood that the analogue computer shown herein is simplified and that more complex and exact mechanization of the computations of Equations 1, 2 and 3 might be obtained. Whereas, in the illustration of Fig. 1, programming is obtained only in the pitch channel, programming might also be obtained similarly in the roll and yaw channels in those cases not making the simplifying assumptions of equations 4, 5 and 6.

A feature of the invention is the use of rate gyroscopes having a sufficient range of operation to indicate both the high and low angular velocities of the airframe. The device of the invention utilizes no stabilizing element but, rather, mounts the gyroscopes directly on the missile frame.

In guiding a short-range ballistic missile, two quantities must be taken into account. The first is the angle $\psi$, which determines the inclination of the trajectory at cut-off. The invention as so far described has been concerned only with this quantity. The second is the missile velocity at cutoff. By cutting off the motor at a predetermined velocity the range of the missile is predetermined.

Velocity is typically measured by a translational accelerometer and integrator. In some cases the two elements are combined into a single device (e.g., gyro pendulum). The following considerations apply in either case.

An accelerometer cannot distinguish the acceleration of gravity, $g$, from missile acceleration. Ordinarily the accelerometer is stabilized by use of a gyroscopically stabilized platform so as to remain horizontal and therefore be insensitive to $g$.

In the system of the present invention, which avoids the complication of stabilization, the accelerometer may be mounted so as to respond to accelerations along the $x$-axis (longitudinal axis) of the missile. This axis will normally be parallel to the flight path or, will vary therefrom by a small and predictable angle at the time of cutoff.

The accelerometer, being unstabilized, requires compensation for $g$.

Figure 7:
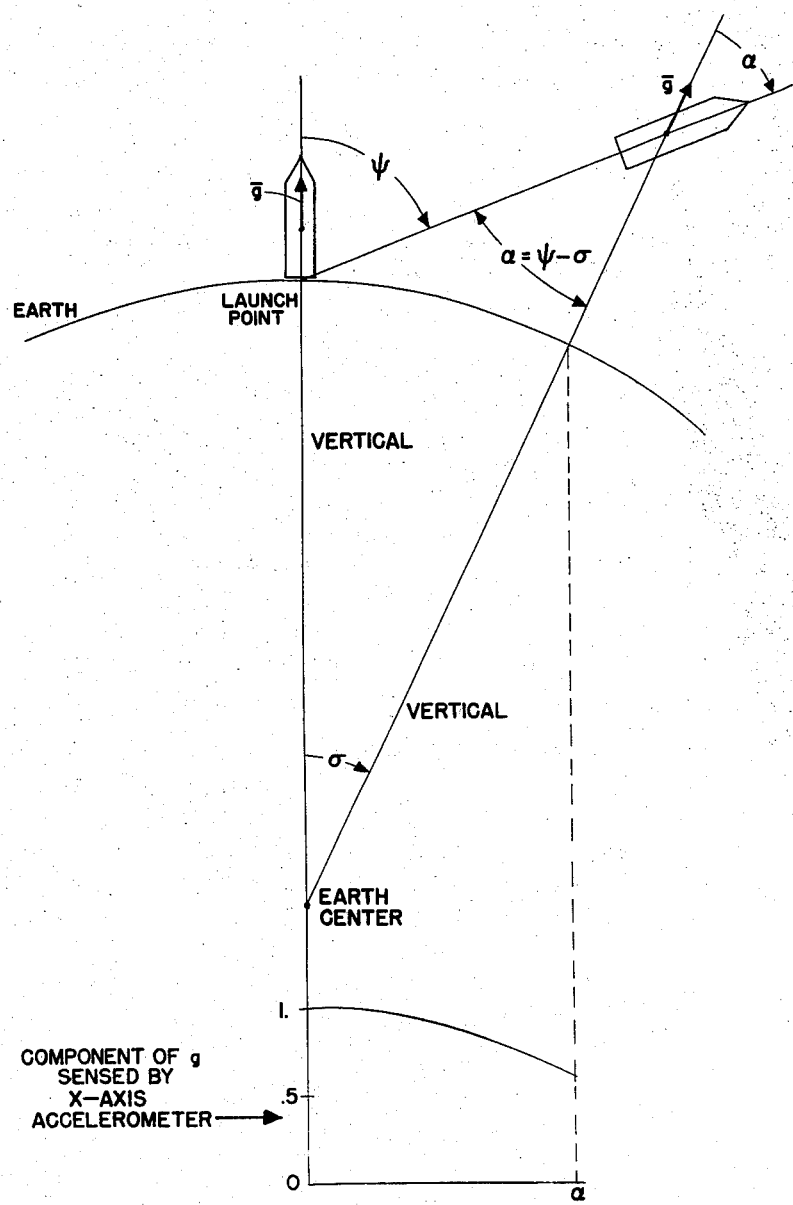
Fig. 7 is a diagram aand a graph showing gravity correction components.

Referring to Fig. 7, it is seen that in the launch position the accelerometer senses the full acceleration of gravity $g$, whereas at the time of cutoff it senses only a component of $g$. The component of $g$ sensed proportional to cos $\alpha$, where $\alpha=\psi-\sigma$; $\sigma$ being the angle between the instantaneous local vertical and the vertical at the launching point.

If missile distance traveled, and altitude, were known accurately as a function of time, $\sigma$ would be a function of time alone and $\alpha$ and cos $\alpha$ could be computed as a mere function of time, since $\psi$ is programmed and α=ψ−σ. However, for many purposes a sufficiently close correction can be made without knowing position or altitude but only velocity. In particular, by programming the missile velocity (by control of the motor, etc.) it is possible to compute the correction as a function of time, with fair accuracy.

Figure 8:
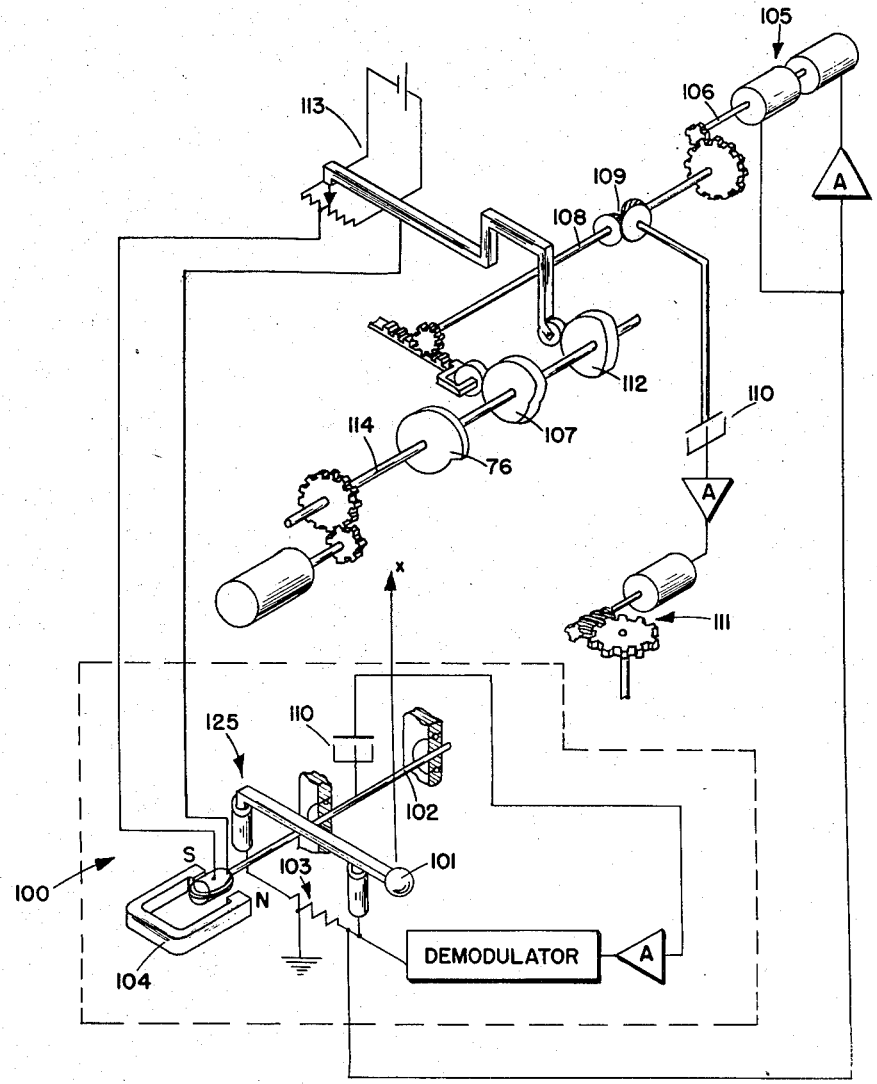
Fig. 8 is a schematic of a velocity control system.

Referring to Fig. 8, an accelerometer 100 is provided, responsive to accelerations along the missile x-axis. The accelerometer, which is not in itself considered an invention, includes an unbalanced mass 101 mounted on a shaft 102 supported in hydrodynamic or other low-friction bearings (not shown) and provided with an E-type pickoff 110 and torquer assembly 125 similar to elements 10 and 25 in Fig. 3 and Fig. 4. The pickoff signal is amplified, demodulated and applied to the torquer exactly as described in connection with the rate gyro. Upon occurrence of acceleration, deflection of the mass 101 is sensed by the pickoff 110 and the current at resistor 103 is an accurate measure of acceleration. The accelerometer also has a g-corrective torquer 104 (d'Arsonval movement or the equivalent) for purposes described below.

At 105 is an amplifier, motor-tachometer combination similar to amplifier 46, motor 49, and tachometer 52 in Fig. 1. The velocity of shaft 106 is proportional to the signal indicating acceleration supplied to the tachometer from the accelerometer.

Programmer shaft 114 (also shown in Fig. 6) is fitted with an extra cam 107 for velocity programming. It operates a shaft 108 coupled with 106 at differential 109. The output of the differential has an E-type pickoff 110 controlling thrust-regulating means 111. So long as the velocity as measured by accelerometer 100 and integrator 105 agrees with the programmed velocity, pickoff 110 is at null; discrepancy causes a correction of the missile velocity by control at 111.

Since angle ψ, and velocity are both known, the tilt of axis x relative to vertical is known approximately as a function of time. Therefore, g-compensation can be performed as a function of time by a cam 112 on shaft 73. The cam applies a suitable correction to the accelerometer via a potentiometer 113 and the g-correction torquer 104. (We could also use the torquer 125 for this purpose if desired, but the circuitry is simpler if two electrically-independent torquers are used.)

The above-described feature, then, provides vehicle velocity control such as might be desired in guidance systems using predetermined cutoff at a given velocity.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, a plurality of rate gyroscopes each having an operable angular velocity signal range from the magnitude of missile angular velocities to earth angular velocity, the input axes of said gyroscopes oriented in predetermined relationship with respect to each other to define a first coordinate system, computer means connected to receive the output signals from said gyroscopes and connected to transform said signals to a second coordinate system having a known relation to inertial space, means for integrating said transformed signals, providing signals indicating attitude in said second coordinate system, and means responsive to said second system signals for substantially preserving a known orientation of said first coordinate system in inertial space.

2. In combination, a plurality of rate gyroscopes each having an operable angular velocity signal range from the magnitude of missile angular velocities to earth angular velocity, the input axes of said gyroscopes oriented along orthogonal axes with respect to each other to define a first coordinate system, computer means connected to receive the output signals from said gyroscopes and connected to transform said signals into a second coordinate system having a known relation to inertial space, means for integrating said transformed signals, providing signals indicating attitude in said second coordinate system, whereby flight control signals of attitude and angular velocity are produced, and means responsive to said flight control signals for substantially preserving a known orientation of said first coordinate system in inertial space.

3. In combination with a missile, a plurality of rate gyroscopes on said missile each having an operable angular velocity over a range from the magnitude of missile angular velocities to earth angular velocity, the input axes of said gyroscopes oriented along the missile pitch, roll, and yaw axes, respectively to define a missile fixed coordinate system, computer means connected to receive the output of said rate gyroscopes, said computer comprising means adapted to transform the angular velocity signals received from said gyroscopes into pitch, roll, and yaw signals in a second coordinate system having a known relation to inertial space, said computer further comprising means for integrating the signals of angular velocities providing signals as to attitude in said second coordinate system, and said computer further comprising means providing signals according to the angular velocities in said second coordinate system, whereby flight control signals of attitude and angular velocity are produced, and means responsive to said flight control signals for substantially preserving a known orientation of said missile in space.

4. The combination recited in claim 3 wherein the average angular motion of said roll and yaw gyroscopes about their sensitive axes are maintained within a few degrees of zero.

5. The combination recited in claim 3 wherein is included accelerometer means, means for programming a signal representing gravity correction according to missile attitude, said accelerometer connected to receive said programmed signal of gravity correction, means for integrating the output signal of said accelerometer, means for providing a signal representing programmed vehicle velocity, means for determining the difference between said signal of programmed vehicle velocity and said integrated output signal of said accelerometer.

6. The combination recited in claim 3 wherein is included accelerometer means, means for programming correction to said accelerometer for gravity according to missile attitude, means for integrating the output signal of said accelerometer, means for generating signals representing programmed pitch attitude as a function of time, means for generating signals representing programmed velocity as a function of time, means for determining the difference between said signal of programmed vehicle velocity and the integrated signal of said accelerometer.

7. In combination, a plurality of rate gyroscopes having operable angular velocity over a range from the magnitude of missile angular velocities to earth angular velocity, the input axes of said gyroscopes oriented along orthogonal axes with respect to each other to define a first coordinate system, computer means connected to receive the output of said rate gyroscopes, said computer comprising means adapted to transform the angular velocity signals received from said gyroscopes into a second coordinate system having a known relation to inertial space, said computer further comprising means adapted to integrate the signals of angular velocities in said second coordinate system, and said computer further comprising means providing signals according to the angular velocities in said second coordinate system, means for generating a signal representing programmed attitude about the sensitive axes of at least one of said gyroscopes, means for detecting the difference between said signal indicating programmed attitude and the corresponding integrated signal of angular velocity in said second coordinate system, and means responsive to said integrated signals and said second system angular velocity signals for controlling the spatial orientation of said first system.

8. The combination recited in claim 7 wherein the average angular rotation of said rate gyroscopes about unprogrammed attitudes is maintained substantially at zero.

9. In a flight control system, three rate gyroscopes having an operable angular velocity over a range from the magnitude of missile angular velocities to earth angular velocity, the input axes of said gyroscopes oriented in pitch, roll and yaw, respectively to define a first coordinate system, computer means connected to receive the output of said rate gyroscopes, said computer comprising means adapted to transform the angular velocity signals received from said gyroscopes into a second coordinate system having a known relation to inertial space, said computer further comprising means adapted to integrate the signals of angular velocities providing control signals indicating attitude in pitch, roll, and yaw, in said second coordinate system, and said computer further comprising means providing control signals as to angular velocities in said second coordinate system, means for generating a signal representing a programmed pitch angle, means for detecting the difference between said signal of programmed pitch and said pitch attitude signal, and flight control means for controlling the spatial orientation of said first coordinate system in accordance with said control signals.

10. The combination recited in claim 9 wherein said flight control means includes means responsive to said signal indicating difference in said signal of programmed pitch and said pitch attitude signal.

11. The combination recited in claim 9 wherein is included an accelerometer, means for providing a signal representing correction for gravity according to said programmed pitch angle, said means for providing a correcting signal connected to said accelerometer, means for integrating the output signal of said accelerometer, means for programming vehicle velocity according to said programmed pitch angle, means for determining the difference between the integrated output signal of said accelerometer and said signal of programmed vehicle velocity.

12. In combination, a plurality of rate gyroscopes having an operable angular velocity over a range from the magnitude of missile angular velocities to earth angular velocity, the input axes of said gyroscopes oriented in pitch, roll, and yaw, respectively to define a first coordinate system, computer means connected to receive the output of said rate gyroscopes, said computer comprising means adapted to transform the angular velocity signals received from said gyroscopes into a second coordinate system having a known relation to inertial space, said computer further comprising three motor-tachometer integrating devices connected to receive and integrate signals of angular velocity in roll, pitch, and yaw, respectively, in said second coordinate system, means for generating a signal representing the programmed attitude about at least one of the pitch, roll, and yaw axes, means for detecting the difference between said programmed signal of attitude and its corresponding integrated signal of attitude, and means responsive to said integrating devices and to said difference detecting means for preserving a substantially known spatial orientation of said first system.

13. In a navigational flight control system for a missile, a plurality of rate gyroscopes fixed with respect to each other and disposed with input axes at right angles to each other to define a first coordinate system, said gyroscopes operable to provide electrical signals indicating angular velocity over a range of at least one radian per second to 0.0001 radians per second, computer means connected to receive the outputs of said rate gyroscopes, said computer means adapted to provide Euler's angle transformation of said signals to a reference coordinate system having a known relation to inertial space and said computer further adapted to integrate the electrical signals representing angular velocities in said reference coordinate system, means generating a signal representing predetermined, programmed angles of attitude about at least one input axis of said gyroscopes, means for comparing said programmed attitude signal with its corresponding integrated signal, and means responsive to said reference coordinate system signals for substantially preserving a known spatial orientation of said first coordinate system.

14. In a flight control system for a missile, three rate gyroscopes adapted to be fixedly mounted, said gyroscopes disposed with input axes lying along pitch, roll and yaw, respectively to define a first coordinate system, said gyroscopes providing electrical signals indicating angular velocities over a range of at least one radian per second to 0.0001 radians per second, computer means connected to receive the outputs of said rate gyroscopes, said computer means operable to provide Euler's angle transformation of said signals to a reference coordinate system and to integrate said signals to provide short and long period control signals respectively, means for generating a signal representing the programmed attitude about the pitch axis of said aircraft, means connected to detect the difference between said programmed pitch signal and said integrated pitch signal whereby is provided a pitch flight control signal, and flight control means responsive to said control signals for substantially preserving a known spatial orientation of said first coordinate system.

15. In combination with a missile, a plurality of rate gyroscopes each having an operable angular velocity over a range from the magnitude of missile angular velocities to earth angular velocity, the input axes of said gyroscopes oriented along orthogonal axes with respect to each other, computer means connected to receive and integrate the output signals from said gyroscopes to produce flight control signals of attitude and angular velocity, a missile attitude control for each of said axes, and means for feeding said flight control signals to said attitude controls to automatically reduce said signals to zero.

16. In a missile guidance system, a rate gyroscope capable of giving a signal substantially linearly proportional to angular velocities over a range including earth rate, at one extreme, and maximum missile angular velocities at the other, the input axis of said gyroscope being disposed parallel to the pitch axis of the missile, first integrating means connected to receive the output signal from said rate gyro giving an output signal proportional to angular displacement about said pitch axis, programming means for producing a signal representing pitch programmed as a function of a predetermined variable, means for controlling angular movements of the missile about said pitch axis in a sense to null the sum of the integrating means output signal and the programmer signal, accelerometer means responsive to translational acceleration along the longitudinal axis of the missile, second integrating means connected to receive the output of said accelerometer, a motor velocity control device operable by the output of said second integrating means, and means associated with the programming means for applying a gravity correction bias signal to the accelerometer, whereby effect of the programmed pitch in subjecting the accelerometer to a variable component of gravity is nullified.

17. A vehicle control system for a vehicle having apparatus for controlling the attitude thereof comprising means including a plurality of rate gyroscopes for generating signals indicative of angular velocities of said vehicle about a first set of axes fixedly related to said vehicle, computer means responsive to said signals for generating control signals indicative of angular velocities of said vehicle about a second set of axes having a predetermined relation to inertial space, and means for operating said vehicle attitude control apparatus in response to said control signals to preserve a substantially known spatial orientation of said vehicle.

18. The system of claim 17 including means for generating signals in accordance with translational acceleration of said vehicle and a programmed function of gravity, means for correcting said acceleration signal in accordance with said gravity signal, and means responsive to said corrected acceleration signal for maintaining a programmed velocity of said vehicle.

19. In a vehicle guidance system, programming means for producing a signal representing a programmed attitude of said vehicle about a predetermined axis, means responsive to said signal for maintaining said vehicle substantially in said programmed attitude, accelerometer means for producing a signal representing vehicle velocity along said axis, means for programming a gravity correction signal as a function of said programmed attitude, means for correcting said accelerometer means in accordance with said gravity signal, means responsive to said corrected accelerometer means for substantially maintaining said vehicle velocity at a programmed value, and means for substantially maintaining a programmed spatial orientation of said vehicle.

References Cited in the file of this patent

UNITED STATES PATENTS

| | | |
|---|---|---|
| 2,368,673 | Metcalf | Feb. 6, 1945 |
| 2,638,288 | Hanna | May 12, 1953 |
| 2,644,941 | Kellogg | July 7, 1953 |
| 2,649,264 | Slatter et al. | Aug. 18, 1953 |
| 2,705,116 | Yates et al. | Mar. 29, 1955 |